US009144097B2

(12) United States Patent
Kao et al.

(10) Patent No.: US 9,144,097 B2
(45) Date of Patent: Sep. 22, 2015

(54) IP CAMERA HAVING REPEATER FUNCTIONS AND METHOD FOR SETTING THE SAME

(71) Applicant: D-Link Corporation, Taipei (TW)

(72) Inventors: Ho-Hsien Kao, Taipei (TW); Chi-Chou Lin, Taipei (TW); Jui-Chang Chen, Taipei (TW)

(73) Assignee: D-LINK CORPORATION, Taipei (TW)

( * ) Notice: Subject to any disclaimer, the term of this patent is extended or adjusted under 35 U.S.C. 154(b) by 189 days.

(21) Appl. No.: 14/053,910

(22) Filed: Oct. 15, 2013

(65) Prior Publication Data

US 2014/0376448 A1 Dec. 25, 2014

(30) Foreign Application Priority Data

Jun. 19, 2013 (TW) .............................. 102121741 U

(51) Int. Cl.
| H04W 88/04 | (2009.01) |
| H04W 76/02 | (2009.01) |
| H04N 7/18 | (2006.01) |
| H04N 5/225 | (2006.01) |
| H04W 84/22 | (2009.01) |
| H04W 84/12 | (2009.01) |

(52) U.S. Cl.
CPC .............. *H04W 76/021* (2013.01); *H04N 5/225* (2013.01); *H04N 7/181* (2013.01); *H04W 84/22* (2013.01); *H04W 84/12* (2013.01)

(58) Field of Classification Search
CPC ... H04W 76/021; H04W 84/22; H04W 84/12; H04N 5/225; H04N 7/181
See application file for complete search history.

(56) References Cited

U.S. PATENT DOCUMENTS

| 2004/0136388 | A1* | 7/2004 | Schaff ........................... 370/401 |
| 2011/0164551 | A1* | 7/2011 | Takebe et al. ................. 370/315 |
| 2011/0211584 | A1* | 9/2011 | Mahmoud ...................... 370/401 |
| 2013/0042279 | A1* | 2/2013 | Sato et al. ........................ 725/62 |
| 2013/0324243 | A1* | 12/2013 | Mikhailov et al. .............. 463/31 |
| 2014/0028435 | A1* | 1/2014 | Brockway et al. ............. 340/3.1 |
| 2014/0028816 | A1* | 1/2014 | Brockway et al. .............. 348/61 |
| 2014/0028818 | A1* | 1/2014 | Brockway et al. .............. 348/61 |
| 2014/0055611 | A1* | 2/2014 | Wong et al. .................... 348/143 |
| 2014/0282679 | A1* | 9/2014 | Kohlenberg et al. ............ 725/25 |
| 2015/0130935 | A1* | 5/2015 | Siann et al. ................. 348/207.1 |
| 2015/0163398 | A1* | 6/2015 | Brockway et al. ............. 248/61 |
| 2015/0163462 | A1* | 6/2015 | Brockway et al. ............ 348/158 |

\* cited by examiner

*Primary Examiner* — Jay P Patel
(74) *Attorney, Agent, or Firm* — Bacon & Thomas, PLLC

(57) ABSTRACT

The present invention is to provide an IP camera having repeater functions, which includes an image-capturing module for capturing images, an image processor for processing the images, a central processor including a network communication module for activating the repeater functions and mediating communication between a root wireless access point (WAP) and an external device, and an antenna electrically connected to the network communication module in order for the IP camera to make wireless connection to the root WAP, upload the images to the Internet and serve as a repeater between the two WAPs, and a memory configured for storing operating software, a plurality of service set identifiers (IDs) and an authentication key. Due to the repeater functions of the IP camera, the external device can identify the IP camera by the IDs and then connect to the Internet, even if the external device is outside coverage of a wireless LAN.

12 Claims, 4 Drawing Sheets

IP CAMERA HAVING REPEATER FUNCTIONS AND METHOD FOR SETTING THE SAME

FIELD OF THE INVENTION

The present invention relates to provide an IP camera, more particularly to an IP camera having repeater functions, such that an external device can identify the IP camera by a plurality of service set identifiers stored in the IP camera and then connect to the Internet, even if the external device is outside coverage of a wireless LAN, thereby effectively eliminating dead zones of a root WAP and expanding the coverage of the wireless LAN.

BACKGROUND OF THE INVENTION

The last decade has seen substantial growth of the security surveillance industry not only due to technological advancements, but also due to the increasing need for telecommunication and the rising awareness of community security. As a result, surveillance cameras nowadays can be found almost everywhere in our daily lives. According to market survey reports, the security surveillance market has grown annually by up to 11%~13%. In 2011, the market value of the security surveillance industry worldwide approached 200 billion US dollars, which is comparable to that of the personal computer industry and demonstrates the market potential of the former industry.

Surveillance cameras can be divided into two general categories: analog and digital. Image data captured by a digital camera can be transmitted in a digital format to a network to enable remote surveillance; therefore, this type of cameras is also referred to as network cameras or IP (Internet protocol) cameras. IP cameras have such advantages over the traditional analog cameras as higher image resolution, encrypted data transmission, and integration of multiple functions (e.g., head counting, vehicle license plate recognition, and network alarm). Consequently, IP cameras have become an important subject of research and development in the related fields.

An IP camera, though featuring high image clarity and supporting network-based remote surveillance, must receive both electric signals and network signals in order to work properly. Therefore, in a network environment where it is difficult to install network cables in all the places to be monitored, the use of IP cameras may present a problem. Despite the fact that wireless network technology is maturing and that portable electronic devices are now in extensive use, wireless networks may not always be an applicable solution because wireless network signals only have a limited transmission range and tend to be obstructed by barriers. To increase the transmission range and strength of wireless network signals, network devices such as bridges and repeaters are required, and the network devices to be used must suit the network environment in question. Moreover, the network devices as well as the IP cameras must be individually set, or they cannot function as desired. Considering the additional costs of purchasing and installing the network devices and the arduous setting process, most consumers seem reluctant to embrace this network device approach. Besides, the need for wireless networks is increasing due to the prevalence of portable electronic devices. If it is desired to expand the coverage of wireless networks and eliminate dead zones, i.e., areas where wireless network signals cannot reach, the general public has no other choice than to install more network devices, which, however, is economically inefficient. Given the reasons stated above, network devices such as bridges and repeaters have yet to be widely used.

In light of the above, the present inventor came up with the idea of adding repeater functions to IP cameras so that IP cameras not only can receive wireless network signals, but also can mediate the received wireless network signals and forward packets, thereby increasing the signal strength and coverage of wireless networks. To this end, the inventor has conducted extensive research and tests, with the intention of designing an IP camera with repeater functions, which design is also the issue to be addressed by the present invention.

BRIEF SUMMARY OF THE INVENTION

In view of the fact that the applicability of the conventional IP cameras has been restricted by the limited coverage of wireless networks and the adverse effects of barriers on such networks, the inventor of the present invention incorporated years of practical experience into repeated tests and improvements and finally succeeded in developing an IP camera with repeater functions and a setting method thereof. The present invention is intended to facilitate the installation and use of IP cameras and thereby enable the creation of network environments which are easy to use and set.

It is an object of the present invention to provide an IP camera having repeater functions. The IP camera is applicable to a network system which includes a root wireless access point (WAP) or router, a terminal device, and at least one external device. The root wireless access point is connected to the Internet and is configured for transmitting wireless signals so as to form a wireless local area network (or wireless LAN for short, also known as a basic service set). Both the IP camera and the terminal device are located within the coverage of the wireless LAN. The IP camera includes an image-capturing module, an image processor, a central processor, an antenna, a network connection port, and a memory. The image-capturing module is configured for capturing images and includes a lens set and an image sensor. The image processor is configured for performing a color-related process, a pixel-related process, and a compression process on the images sensed by and transmitted from the image sensor. The central processor includes a network communication module, which defines a mechanism for activating the repeater functions. When the mechanism is started, the network communication module activates the repeater functions so as to mediate communication signals and forward packets between the root WAP and the external device, thereby eliminating dead zones of the root WAP and expanding the coverage of the wireless LAN. The antenna is electrically connected to the network communication module in order for the IP camera to make wireless connection to the root WAP, upload the captured images to the Internet, and serve as a repeater between the root WAP and the external device by mediating communication signals and forwarding packets therebetween. The network connection port is connected to the network communication module so that the IP camera can make wired connection to the terminal device through the network connection port. The memory is configured for storing operating software, a first service set identifier (SSID), a first basic service set ID (which corresponds to a media access control address, or MAC address for short), a second basic service set ID, and an authentication key, wherein the first SSID and the first basic service set ID correspond to the root WAP and the authentication key is equivalent to a private key in the root WAP. Thanks to the repeater functions of the IP camera, the external device can identify the IP camera by the aforesaid IDs and then connect to the Internet, even if the external device is outside the coverage of the wireless LAN.

Another object of the present invention is to provide a method for setting an IP camera with repeater functions. The method includes the following steps to be performed by a central processor in the IP camera when the IP camera is activated. To begin with, the central processor activates a wired Ethernet network connection module in a network communication module of the central processor, thus enabling the IP camera to communicate with a terminal device in a wired manner. Next, according to a command given by the user through a web control user interface of the terminal device, the central processor activates a wireless client module in the network communication module in order for the wireless client module to conduct a site survey over the wireless LAN where the IP camera is located. The central processor then reads a first SSID and a first basic service set ID of a detected root WAP and transmits the first SSID to the terminal device, which displays the first SSID for reference by the user. After that, the central processor receives an authentication key sent by the user through the web control user interface of the terminal device. Once it is determined that the authentication key matches a private key of the root WAP, the central processor stores the first SSID, the first basic service set ID, and the authentication key into a memory of the IP camera, wherein the memory also stores a second basic service set ID. Thus, using the data stored in the memory, the IP camera can connect to and transmit images captured thereby to the root WAP. Lastly, the central processor activates a wireless access point module and a distribution system service module in the network communication module according to another command given by the user through the web control user interface of the terminal device, enabling the IP camera to transmit wireless signals, make wireless connection to an external device, and serve as a repeater between the root WAP and the external device by mediating network communication signals and forwarding packets therebetween.

BRIEF DESCRIPTION OF THE SEVERAL VIEWS OF THE DRAWINGS

The technical features as well as the process flow and further objects of the present invention will be best understood by referring to the following detailed description of some illustrative embodiments in conjunction with the accompanying drawings, in which.

DETAILED DESCRIPTION OF THE INVENTION

Figure 1:
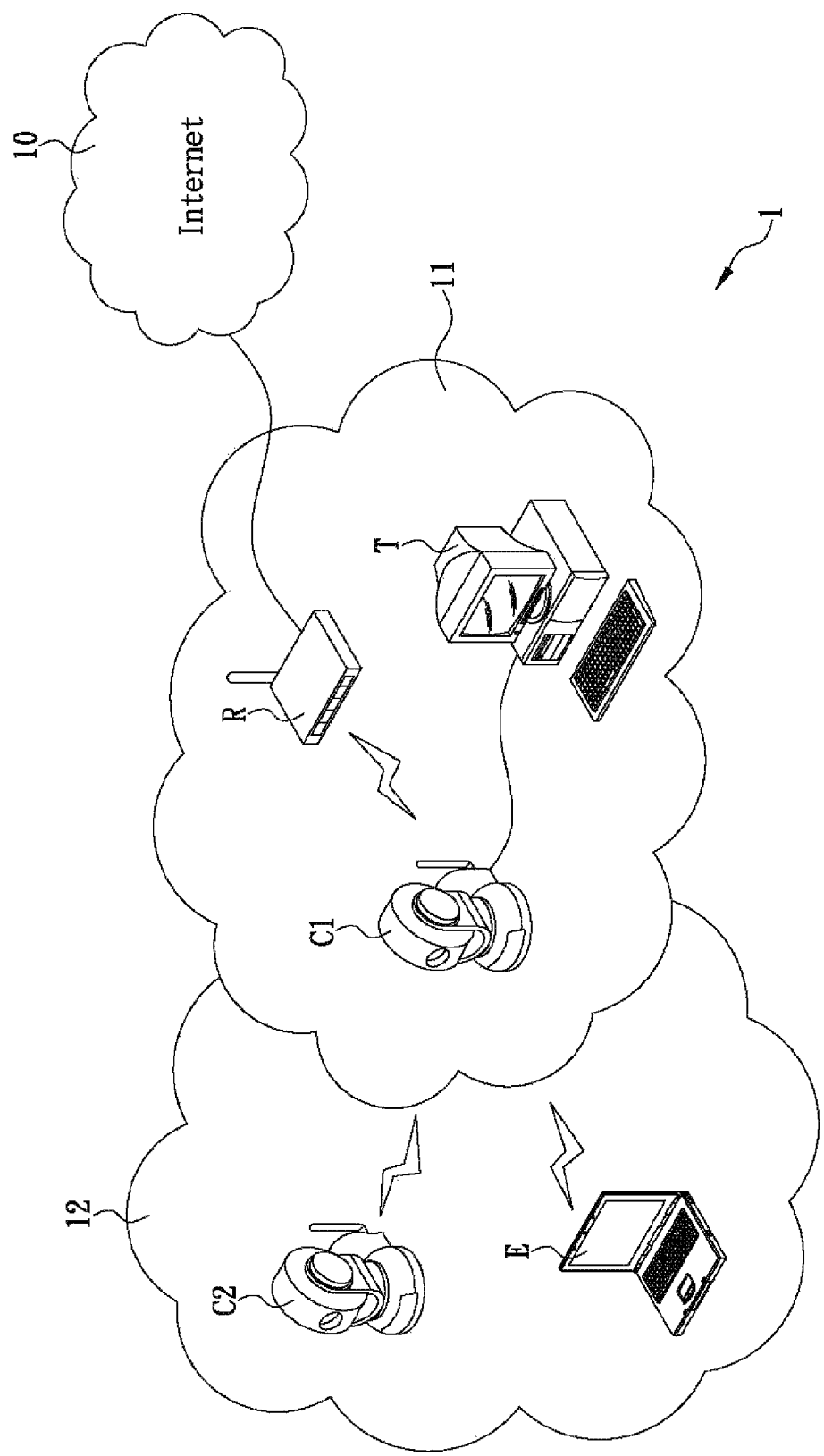
FIG. 1 schematically shows a network system to which the IP camera of the present invention is applied.

The present invention provides an IP camera having repeater functions and a method for setting the same. Referring to FIG. 1 for the first preferred embodiment of the present invention, the IP camera C1 is applied to a network system 1 which includes a root wireless access point (or root WAP for short) R, a terminal device T, and at least one external device E (e.g., personal computer, notebook and smart phone). The root WAP R is connected to the Internet 10, is provided with a first basic service set ID, and is configured for transmitting network signals wirelessly in order to provide service for first wireless local area network (or wireless LAN for short, also known as a basic service set) 11 which covers the IP camera C1, the root WAP R, and the terminal device T.

Figure 2:
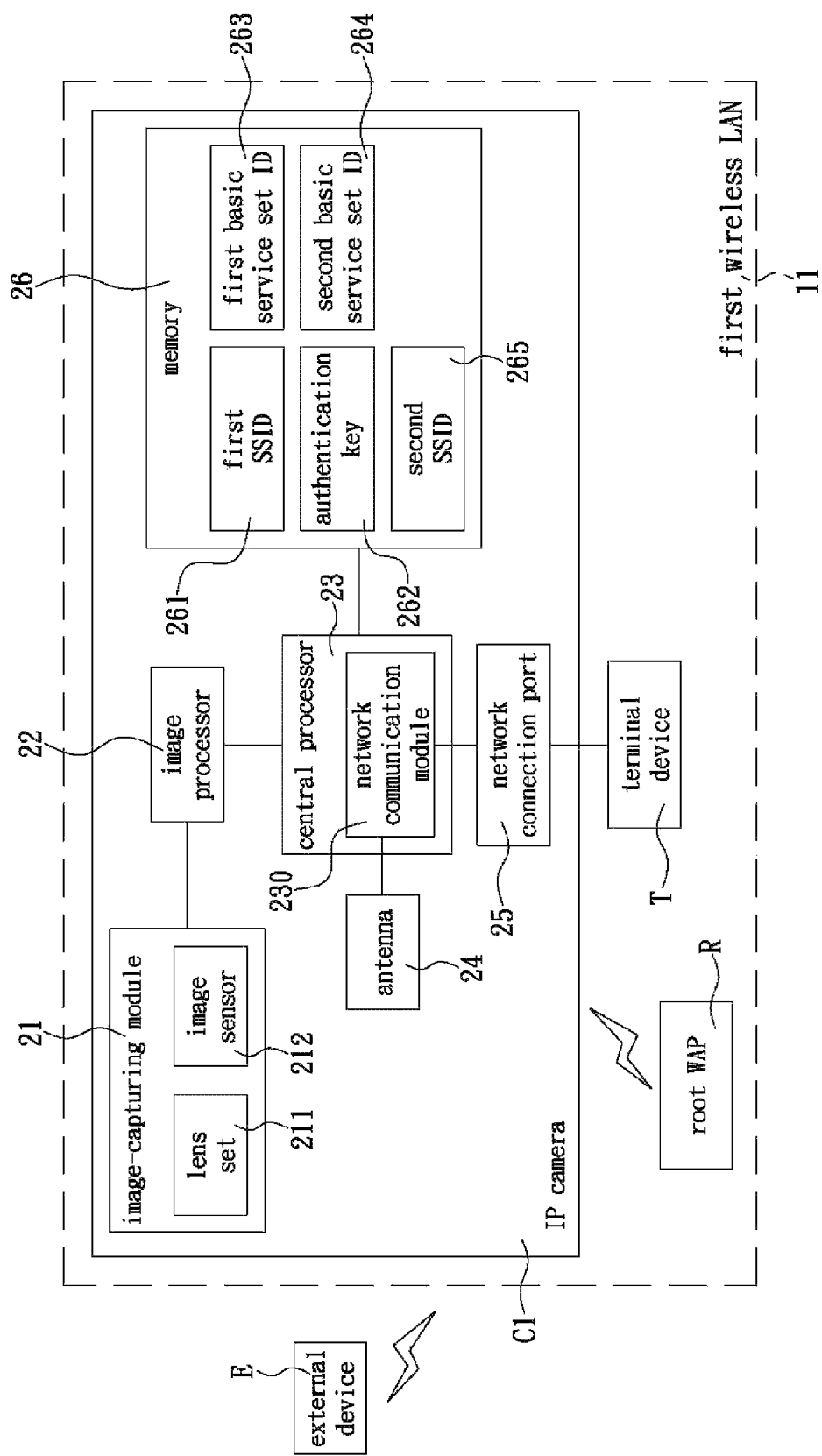
FIG. 2 is a block diagram of the first preferred embodiment of the IP camera of the present invention.

Referring to FIG. 1 and FIG. 2, the IP camera C1 includes an image-capturing module 21, an image processor 22, a central processor 23, an antenna 24, a network connection port 25, and a memory 26. The image-capturing module 21 includes a lens set 211 and an image sensor 212 in order to capture images of objects around the IP camera C1. The image processor 22 is electrically connected to the image-capturing module 21 in order to receive the images captured thereby, perform a color-related process, a pixel-related process, and a compression process on the images, and convert the images into digital signals.

As shown in FIG. 1 and FIG. 2, the central processor 23 includes a network communication module 230 constructed according to specific network protocols. The network communication module 230 may use such a structural model as the Transmission Control Protocol and Internet Protocol (TCP/IP) model or the International Organization for Standardization Open System Interconnection (ISO/OSI) model. The aforesaid structural models are provided only for reference by a person skilled in the art and are not an essential feature or limitation of the present invention.

The ISO/OSI model, which is created by the International Organization for Standardization for computer interconnection standards applicable specifically to open network architectures, divides network operations into seven layers; based on the respective network transmission modes of the seven layers, specifications and standards corresponding to each layer are defined. The seven layers are the physical layer, the data-link layer, the network layer, the transport layer, the session layer, the presentation layer, and the application layer. The three layers from the physical layer to the network layer serve mainly to provide network services, while the remaining four layers provide application-oriented services. In the more extensively used TCP/IP model, on the other hand, a total of four layers are defined, namely the link layer, the Internet layer, the transport layer, and the application layer.

Figure 3:
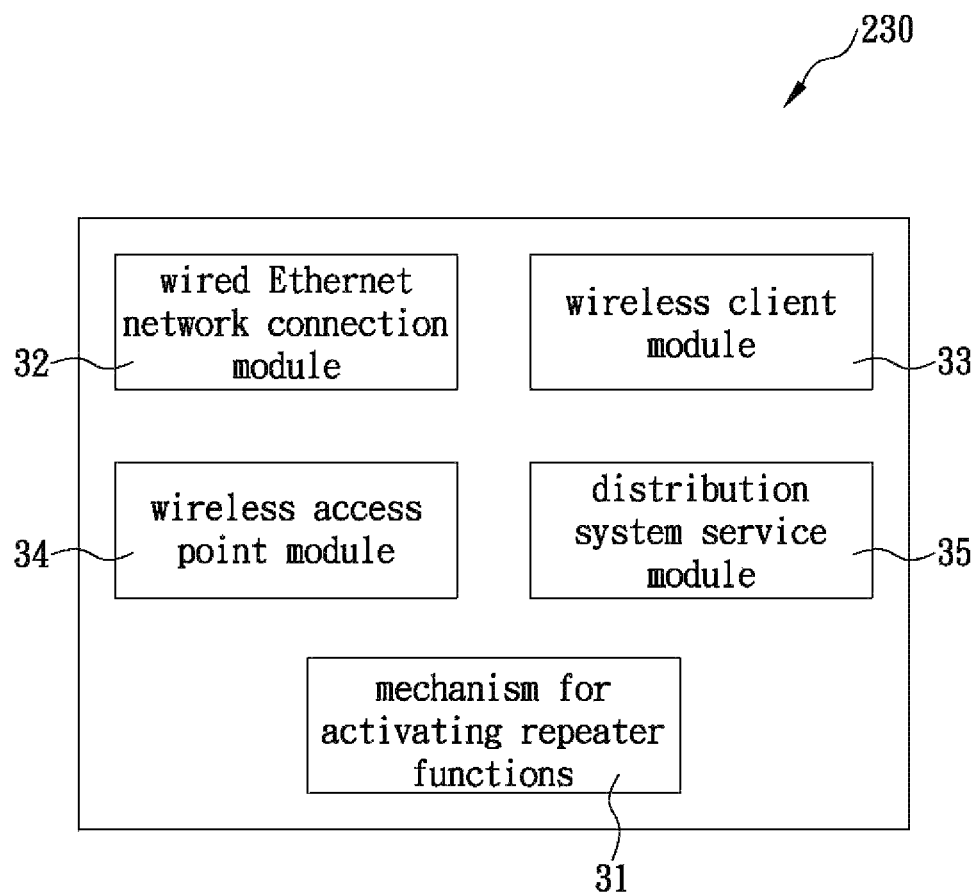
FIG. 3 is a block diagram of the network communication module in the IP camera of the present invention.

In the first preferred embodiment of the present invention, referring to FIG. 1 to FIG. 3, the network communication module 230 defines a mechanism 31 for activating repeater functions. The mechanism 31 corresponds to the physical layer and the data-link layer in the ISO/OSI model or the link layer in the TCP/IP model. Once the mechanism 31 is activated, the network communication module 230 activates the repeater functions. Hence, upon receiving an external data packet, the network communication module 230 proceeds by determining the IP address and port number of the destination of the data packet. If it is determined that the destination of the data packet is not the IP address of the IP camera C1, the network communication module 230 will forward the data packet, thereby realizing the functions of mediation and packet forwarding between the root WAP R and the external device E, eliminating dead zones in wireless communication therebetween.

The antenna 24 is electrically connected to the network communication module 230 so that the IP camera C1 can make wireless connection to the root WAP R and upload/download the aforesaid digital data to the Internet 10 via the root WAP R. (Please note that the Internet 10 is provided herein as the destination of the digital data by way of example only. In practice, the IP camera C1 may deliver the digital data through the Internet 10 to a mobile electronic device or a surveillance server.) Furthermore, when the mechanism 31 in the network communication module 230 is activated, the IP camera C1 to function as a repeater between the root WAP R and the external device E by mediating communication signals and forwarding packets therebetween.

The network connection port 25 is connected to the network communication module 230 in order for the IP camera C1 to connect to the terminal device T in a wired manner through the network connection port 25, thereby enabling the setting procedure of the first wireless LAN 11. The memory 26 stores the operating software necessary to the IP camera C1, as well as a first service set identifier (SSID) 261, an authentication key 262, and a first basic service set ID 263, the latter three of which correspond to the root WAP R. The first SSID 261 can be used to identify the root WAP R. The authentication key 262 matches a private key in the root WAP R.

The first basic service set ID 263 is the media access control address (MAC address) of the root WAP R. The memory 26 also stores a second basic service set ID 264 which corresponds to the MAC address of the IP camera C1. The basic service set IDs 263 and 264 enable device identification during wireless communication. The IP camera C1 can make wireless connection to the root WAP R according to the data stored in the memory 26.

As the IP camera C1 is provided with repeater functions, wireless signals generated by the root WAP R can be extended outward through the IP camera C1 to form a second wireless LAN 12 for use by the external device E. Referring to FIG. 1, if it is desired to use a plurality of IP cameras, e.g., the IP cameras C1 and C2, but only the IP camera C1 is within the coverage of the first wireless LAN 11, the other IP camera C2 can be placed within the coverage of the second wireless LAN 12 to receive indirectly (i.e., via the IP camera C1) the wireless signals transmitted by the root WAP R. Thus, the arrangement of the IP cameras C1 and C2 is given more flexibility, and network cabling is made easier and less complicated than in the prior art.

Figure 4:
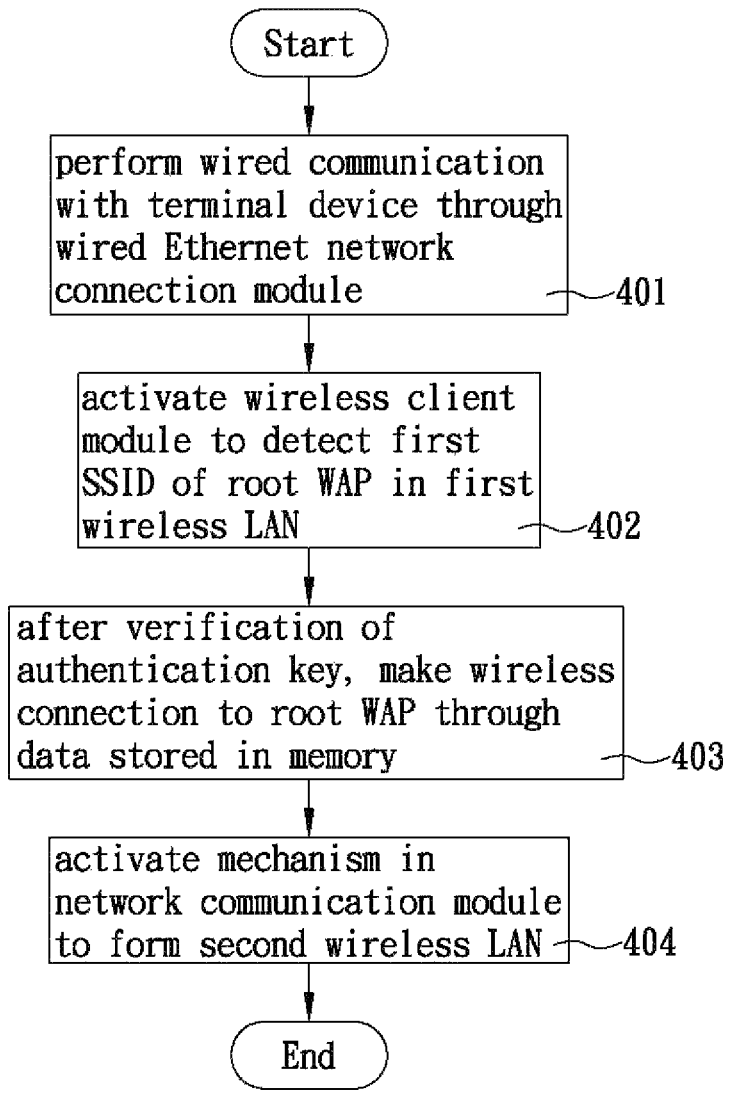
FIG. 4 is the flowchart of a method for setting the IP camera of the present invention.

Referring to the flowchart of FIG. 4 in conjunction with FIG. 1 to FIG. 3, the mode of implementing the present invention is now further described by detailing the steps to be performed by the central processor 23 of the IP camera C1 as below:

(401) In the beginning, with the IP camera C1 connected to the terminal device T via the network connection port 25, the network communication module 230 performs wired communication with the terminal device T through a wired Ethernet network connection module 32 in the network communication module 230 in order to set the IP camera C1, wherein the Ethernet network connection module 32 complies with the 802.3 network protocols created by the Institute of Electrical and Electronics Engineers (IEEE) and is configured for transmitting the received data to the network layer in the ISO/OSI model or the Internet layer in the TCP/IP model. The terminal device T generates a web control user interface in response.

(402) After the user inputs a first command through the web control user interface, the central processor 23 activates a wireless client module 33 in the network communication module 230 according to the first command. The wireless client module 33, which complies with the IEEE 802.11 network protocols, conducts a site survey over the first wireless LAN 11 and reads the first SSID 261 and the first basic service set ID 263 set in the root WAP R. The terminal device T then displays the first SSID 261 through the web control user interface in order for the user to identify the first wireless LAN 11.

(403) After the user inputs an authentication key 262 through the web control user interface, the central processor 23 transmits the authentication key 262 to the root WAP R. If the root WAP R determines that the authentication key 262 matches a private key stored in the root WAP R, the central processor 23 stores the first SSID 262, the authentication key 262, and the first basic service set ID 263 into the memory 26. Thus, the IP camera C1 can identify the first wireless LAN 11 by the first SSID 261 and the authentication key 262, connect to the root WAP R, and communicate wirelessly with the root WAP R through the first basic service set ID 263, thereby completing the setting process of the IP camera C1. Once the setting process is completed, the IP camera C1 can upload the images captured thereby to the Internet 10 or forward data packets between the external device E and the Internet 10.

(404) After the user inputs a second command through the web control user interface, the central processor 23 activates a wireless access point module 34 and a distribution system service module 35 in the network communication module 230. The wireless access point module 34 and the distribution system service module 35 are compatible with the IEEE 802.11 network protocols and are configured for starting the repeater function activating mechanism 31 in the network communication module 230, so as for the IP camera C1 to send out wireless signals through the antenna 24 and using the second basic service set ID 264 already stored in the memory 26, thereby forming the second wireless LAN 12.

Thus, the IP camera C1 can function as a repeater between the root WAP R and the external device E by mediating communication signals and forwarding packets therebetween, expanding the coverage of the root WAP R. In other words, by means of the IP camera C1, the root WAP R can integrate the first wireless LAN 11 and the second wireless LAN 12 into an extended service set (ESS) in which devices within the coverage of the first wireless LAN 11 can identify the first wireless LAN 11 by the first SSID 261 and the first basic service set ID 263, whereas devices within the coverage of the second wireless LAN 12 can identify the second wireless LAN 12 by the second basic service set ID 264.

In the foregoing steps, the IP camera C1 not only stores the first SSID 261 and the authentication key 262 into the memory 26 after verifying the accuracy of the first SSID 261 and the authentication key 262, but also stores a second SSID 265, which is identical to the first SSID 261, into the memory 26 at the same time, thereby creating the repeater functions, allowing the external device E to view the first wireless LAN 11 and the second wireless LAN 12 as one extended service set, thanks to the SSIDs 261 and 265. In other preferred embodiments of the present invention, however, the IP camera C1 may be so designed that the user may set a new service set ID into the IP camera C1. For example, after the IP camera C1 finishes the setting process in relation to the root WAP R, the user may input a third command through the web control user interface, thereby setting the second SSID 265 into the IP camera C1 (e.g., the first SSID 261 of the root WAP R being "D-Link001", and the second SSID 265 being "D-Link002"). Once the IP camera C1 stores the second SSID 265 into the memory 26, the external device E can identify, by the second SSID 265 (i.e., D-Link002), the second wireless LAN 12 formed by the IP camera C1.

While the invention herein disclosed has been described by means of specific embodiments, numerous modifications and variations could be made thereto by those skilled in the art without departing from the scope of the invention set forth in the claims.

What is claimed is:

1. An Internet protocol (IP) camera having repeater functions, the IP camera being provided in a network system comprising a root wireless access point (WAP), a terminal device, and at least an external device, the root WAP being connected to the Internet and configured for transmitting a wireless communication signal to form a wireless local area network (LAN), the IP camera and the terminal device being located within coverage of the wireless LAN, the IP camera comprising:

an image-capturing module comprising a lens set and an image sensor in order to capture an image;

an image processor electrically connected to the image-capturing module in order to receive the image transmitted from the image sensor and perform a color-related process, a pixel-related process, and a compression process on the image;

a central processor comprising a network communication module, the network communication module defining a mechanism for activating the repeater functions so that, when the mechanism is activated, the IP camera activates the repeater functions and can therefore mediate the communication signal and forward a packet between the root WAP and the external device, thereby eliminating dead zones in wireless communication therebetween;

an antenna electrically connected to the network communication module in order for the IP camera to make wireless connection to the root WAP or the external device and thereby upload the captured image to the Internet or forward to the Internet a data packet transmitted from the external device;

a network connection port connected to the network communication module in order for the IP camera to connect to the terminal device in a wired manner through the network connection port; and a memory for storing operating software, a first service set identifier (SSID), a first basic service set ID, an authentication key, and a second basic service set ID, wherein the first SSID serves to enable identification of the root WAP, the authentication key matches a private key in the root WAP, the first basic service set ID corresponds to a media access control address (MAC address) of the root WAP, and the second basic service set ID corresponds to a MAC address of the IP camera.

2. The IP camera of claim 1, wherein the network communication module is further provided with a wired Ethernet network connection module complying with the IEEE (Institute of Electrical and Electronics Engineers) 802.3 network protocols, and the central processor is configured for performing wired communication with the terminal device through the wired Ethernet network connection module.

3. The IP camera of claim 2, wherein the network communication module is further provided with a wireless client module complying with the IEEE 802.11 network protocols in order for the central processor to detect the root WAP in the wireless LAN and make wireless connection to the root WAP through the wireless client module.

4. The IP camera of claim 3, wherein the network communication module is further provided with a wireless access point module and a distribution system service module, both complying with the IEEE 802.11 network protocols, in order for the central processor to start the mechanism for activating the repeater functions in the network communication module through the wireless access point module and the distribution system service module.

5. The IP camera of claim 1, wherein the mechanism for activating the repeater functions corresponds to the physical layer and the data-link layer in the International Organization for Standardization Open System Interconnection (ISO/OSI) model or the link layer in the Transmission Control Protocol and Internet Protocol (TCP/IP) model.

6. The IP camera of claim 2, wherein the mechanism for activating the repeater functions corresponds to the physical layer and the data-link layer in the International Organization for Standardization Open System Interconnection (ISO/OSI) model or the link layer in the Transmission Control Protocol and Internet Protocol (TCP/IP) model.

7. The IP camera of claim 3, wherein the mechanism for activating the repeater functions corresponds to the physical layer and the data-link layer in the International Organization for Standardization Open System Interconnection (ISO/OSI) model or the link layer in the Transmission Control Protocol and Internet Protocol (TCP/IP) model.

8. A method for setting an Internet protocol (IP) camera having repeater functions, the method being applied to the IP camera and comprising the steps, to be performed by a central processor of the IP camera when the IP camera is activated, of:

activating a wired Ethernet network connection module in a network communication module of the central processor in order for the IP camera to perform wired communication with a terminal device;

activating a wireless client module in the network communication module according to a first command transmitted through a web control user interface of the terminal device, in order for the wireless client module to conduct a site survey over a wireless local area network (LAN) covering the IP camera; and reading a first service set identifier (SSID) and a first basic service set ID of a root wireless access point (WAP) thus detected, wherein the first basic service set ID corresponds to a media access control address (MAC address) of the root WAP;

receiving an authentication key transmitted through the web control user interface and, after the root WAP determines that the authentication key matches a private key in the root WAP, storing the first SSID, the first basic service set ID, and the authentication key into a memory of the IP camera, wherein the memory is provided with a second basic service set ID corresponding to a MAC address of the IP camera, thus allowing the IP camera to make wireless connection to the root WAP or an external device through data stored in the memory and thereby upload a captured image to the Internet or forward to the Internet a data packet transmitted from the external device; and activating a wireless access point module and a distribution system service module in the network communication module according to a second command transmitted through the web control user interface, in order for the wireless access point module and the distribution system service module to start a mechanism defined in the network communication module for activating the repeater functions, thereby enabling the IP camera to serve as a repeater between the root WAP and the external device by mediating a communication signal and forwarding a packet therebetween.

9. The method of claim 8, further comprising the step, to be performed by the central processor after the central processor activates the wireless access point module and the distribution system service module, of: generating a second SSID according to a third command transmitted through the web control user interface, in order for the external device to identify, by the second SSID, a second wireless LAN formed by the IP camera.

10. The method of claim 9, wherein the wired Ethernet network connection module complies with the IEEE (Institute of Electrical and Electronics Engineers) 802.3 network protocols.

11. The method of claim 10, wherein the wireless client module complies with the IEEE 802.11 network protocols.

12. The method of claim 11, wherein the wireless access point module and the distribution system service module comply with the IEEE 802.11 network protocols.

* * * * *